(12) United States Patent
Dockal et al.

(10) Patent No.: US 11,372,193 B2
(45) Date of Patent: Jun. 28, 2022

(54) FOCUS INDICATION MECHANISM FOR BINOCULARS AND SIMILAR DEVICES

(71) Applicant: Meopta U.S.A., Inc., Trinity, FL (US)

(72) Inventors: Libor Dockal, Kostelec u Holesova (CZ); Karel Navratil, Chropyne (CZ); Radek Libicher, Velky Ujezd (CZ); Vladimir Skricil, Velky Ujezd (CZ)

(73) Assignee: Meopta U.S.A., Inc., Trinity, FL (US)

( * ) Notice: Subject to any disclaimer, the term of this patent is extended or adjusted under 35 U.S.C. 154(b) by 177 days.

(21) Appl. No.: 16/854,995

(22) Filed: Apr. 22, 2020

(65) Prior Publication Data
US 2020/0341231 A1     Oct. 29, 2020

Related U.S. Application Data

(60) Provisional application No. 62/837,229, filed on Apr. 23, 2019.

(51) Int. Cl.
*G02B 7/06*     (2021.01)
*G02B 23/00*     (2006.01)
*G01D 5/14*     (2006.01)

(52) U.S. Cl.
CPC ................. *G02B 7/06* (2013.01); *G01D 5/14* (2013.01); *G02B 23/00* (2013.01)

(58) Field of Classification Search
CPC ............. G02B 7/06; G02B 23/00; G01D 5/14
See application file for complete search history.

(56) References Cited

U.S. PATENT DOCUMENTS

| | | | |
|---|---|---|---|
| 10,302,456 B1* | 5/2019 | Choi | H04N 5/2254 |
| 2009/0231693 A1* | 9/2009 | Unsbo | A61B 3/04 359/399 |
| 2013/0127980 A1* | 5/2013 | Haddick | G02B 27/0093 348/14.08 |
| 2013/0222983 A1* | 8/2013 | Roider | B01L 13/00 361/679.01 |
| 2013/0278631 A1* | 10/2013 | Border | G02C 5/143 345/633 |
| 2014/0243750 A1* | 8/2014 | Larsen | G01D 5/145 604/189 |
| 2018/0188004 A1* | 7/2018 | Zhang | H04N 5/33 |

* cited by examiner

*Primary Examiner* — William R Alexander
*Assistant Examiner* — Sharrief I Broome
(74) *Attorney, Agent, or Firm* — Dennis L. Cook

(57) ABSTRACT

An improved focusing mechanism that integrates magnetic measurement of a position sensor magnet on a focus adjustor wherein the focus position is based on capturing a focus mechanism's position with use of the position sensor magnet and 3D magnetometer and storing that captured position in memory thus allowing users to setup and save a focus mechanism's position facilitating the quick re-focusing on previously saved positions is disclosed.

2 Claims, 1 Drawing Sheet

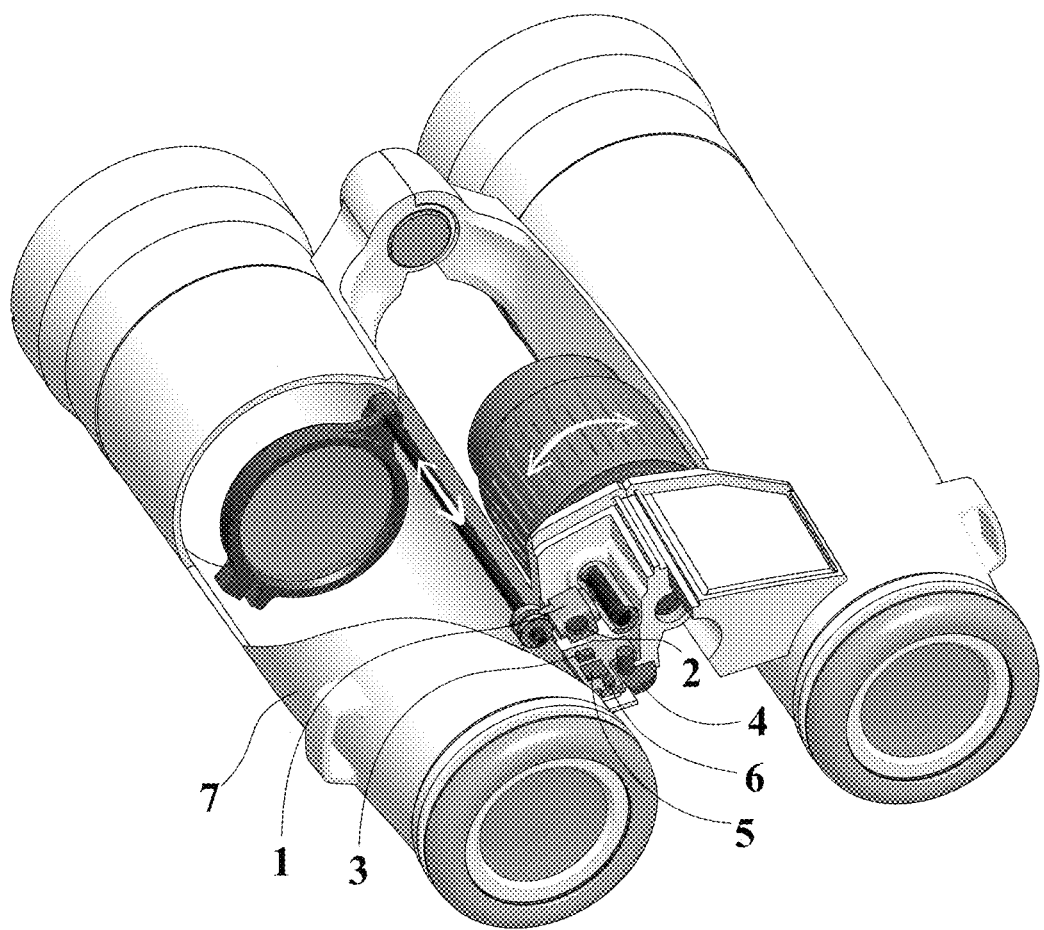

FOCUS INDICATION MECHANISM FOR BINOCULARS AND SIMILAR DEVICES

CROSS REFERENCE TO RELATED APPLICATION

The present application claims the benefit of previously filed Provisional Patent Application, Ser. No. 62/837,229, filed on Apr. 23, 2019.

FIELD OF THE INVENTION

The device and method of this disclosure belongs to the field of focusing mechanisms on binoculars and similar sighting devices. More specifically it is an improved focusing mechanism that integrates magnetic measurement of a position sensor magnet located on/in a sighting device's focus adjustor and then saving the focus adjustor's position, and thus the focus setting, in memory. The user is notified once the position is set and saved to memory facilitating the user's quick re-focusing to previously saved focus positions.

BACKGROUND OF THE INVENTION

In the field of binoculars and other similar devices a manual focus device is one in which the user has to adjust the optical focus of the sighting device by hand by use of a focus adjustor. The focus adjustor itself may be adjusted in a variety of ways. Typical prior art manual focus adjustment systems include thumb knobs or levers on the sighting device body. These types of systems make it troublesome for a user who has moved off one target and focused on a second target to quickly re-focus the sighting device on the previous target.

Thus there is a need for an improved manual focusing mechanisms on binoculars and similar sighting devices that facilitates a user's ability to quickly re-focus the sighting device to previously saved positions

BRIEF SUMMARY OF THE INVENTION

What is disclosed is an improved manual focusing mechanism that integrates magnetic measurement of a position sensor magnet on/in a focus adjustor of a sighting device wherein the focus mechanism's position is saved based on capturing the position of the focusing mechanism by using a position sensor magnet located on/in the focusing adjustor and a 3D magnetometer that measures the position sensor magnet's position, allowing users to set and save to memory a focused adjustment position, and thus the focus setting. The achievement of the set position is then indicated to the user, facilitating the user's ability to quickly re-focus on previously saved positions.

BRIEF DESCRIPTION OF THE DRAWINGS

For a fuller understanding of the nature and objects of the invention, reference should be made to the following detailed description, taken in connection with the accompanying drawing, in which:

FIG. 1 shows a diagram of the preferred embodiment of the disclosed invention.

DESCRIPTION OF THE PREFERRED EMBODIMENT

The disclosed invention is a focusing mechanism of a sighting device (7) such as binoculars that integrates magnetic measurement of a position sensor magnet (2) on a manual focus adjustor (1) wherein the focus position is based on capturing a manual focus adjustor's (1) position with use of a position sensor magnet (2) and 3D magnetometer (3) and storing that captured position in a memory storage device (5) thus allowing users to setup and save a manual focus adjustor's (1) position facilitating the quick re-focusing on previously saved positions. As is well known by those skilled in the art the manual focus adjustor's (1) position that is saved is based on measurement of the values of X and Z of the position sensor magnet (2) on/in the manual focus adjustor (1) in the magnetic field in relation to the 3D magnetometer (3).

The preferred embodiment of the focus indication mechanism comprises a position sensor magnet (2) located on the manual focus adjuster (1) of a binoculars or similar sighting device wherein the position sensor magnet (2) is also located in the proximity of a 3D magnetometer (3) having a focus return set button (4), a memory storage device (5) and a notifying signal device (6) such as sound indicator device, vibrating indicator device, or a visual indicator device.

When a user wants to capture one or more focus settings by using the preferred embodiment focus indication mechanism installed on his/her sighting device (7) such as binoculars or similar device he/she would activate the focus indication mechanism, manually focus the binoculars on a target of interest using the manual focus adjustor (1), press a focus return set button (4) to set that focus position by measuring the X and Y values of the position sensor magnet (2) located on the manual focus adjustor (1) in the magnetic field created by the 3D magnetometer (3), record those measured values in the memory storage device (5) (thus recording the manual focus adjustor's (1) position) and notify the user of the successful memorization of the values via use of the notifying signal device (6) such as a visual indicator device. This allows the user, after focusing on a new target, to re-focus to that set position for the first target by easily moving the manual focus adjustor (1) back to the set position and receiving notification of the correct focus via the notifying signal device (6).

Since certain changes may be made in the above described focus indication mechanism without departing from the scope of the invention herein involved, it is intended that all matter contained in the description thereof or shown in the accompanying FIGURE shall be interpreted as illustrative and not in a limiting sense.

What is claimed is:

1. A manual focusing mechanism located on a sighting device that includes a manual focus adjuster that allows a user to easily return to a previously focused position comprising:
   a position sensor magnet;
   said position sensor magnet located on said sighting device's manual focus adjustor;
   a three-dimensional magnetometer located on said sighting device creating a magnetic field that covers said position sensor magnet such that the position of said manual focus adjuster can be measured;
   a memory storage device located on said sighting device;
   a focus return set button located on said sighting device that loads a position of said manual focus adjuster determined by said position sensor magnet and said three-dimensional magnetometer into said memory storage device when a user presses said focus return set button; and,
   a notifying signal device located on said sighting device to notify a user when said position of said manual focus adjuster is loaded into said memory storage device and whenever said manual focus adjuster is moved back by the user to said loaded position of said manual focus adjuster in said memory storage device.

2. The manual focusing mechanism of claim 1 wherein said notifying signal device produces a visual signal that can be seen by a user.

\* \* \* \* \*